United States Patent [19]

Schuster

[11] Patent Number: 4,469,295
[45] Date of Patent: Sep. 4, 1984

[54] HYDRODYNAMIC RAM ATTENUATING FUEL TANK

[75] Inventor: Irving Schuster, Columbus, Ohio

[73] Assignee: Rockwell International Corporation, El Segundo, Calif.

[21] Appl. No.: 972,141

[22] Filed: Dec. 21, 1978

[51] Int. Cl.³ .................... B64D 37/08; B65D 25/04; B65D 25/18
[52] U.S. Cl. .................. 244/135 R; 220/22; 220/89 A; 220/445; 220/900; 137/68 R
[58] Field of Search .......... 244/135 R, 135 B, 135 A, 244/135 C; 220/900, 88 R, 469, 445, 426, 89 A, 22; 137/68 R

[56] References Cited

U.S. PATENT DOCUMENTS

| | | | |
|---|---|---|---|
| 1,930,285 | 10/1933 | Robinson | 220/455 X |
| 1,950,234 | 3/1934 | Ewertz | 220/445 X |
| 2,316,116 | 4/1943 | Thompson et al. | 220/22 |
| 2,387,353 | 10/1945 | Raymond | 137/68 R |
| 2,397,184 | 3/1946 | Klose | 220/445 X |
| 2,464,827 | 3/1949 | Noyes | 244/135 B X |
| 2,754,992 | 7/1956 | Wilson | 220/900 X |
| 2,777,656 | 1/1957 | Clifton | 244/135 B |
| 2,844,269 | 7/1958 | Durbin | 220/900 X |
| 2,850,083 | 9/1958 | Frost | 244/135 R X |
| 3,131,893 | 5/1964 | Boucher et al. | 244/135 R |
| 3,787,279 | 1/1974 | Winchester | 220/900 X |
| 4,172,573 | 10/1979 | Moore et al. | 220/469 X |

FOREIGN PATENT DOCUMENTS 319918  4/1920  Fed. Rep. of Germany ... 244/135 R

Primary Examiner—Allan N. Shoap
Attorney, Agent, or Firm—Charles T. Silberberg

[57] ABSTRACT

An aircraft fuel tank subject to penetration by projectiles that is improved by virtue of being a segmented container having a frangible liner secured to one internal wall of the fuel container thereby forming an auxiliary tank. Damage caused by hydrodynamic ram effects by a projectile penetrating the main tank is minimized by the rupturing and/or distortion of the frangible liner.

11 Claims, 4 Drawing Figures

HYDRODYNAMIC RAM ATTENUATING FUEL TANK

BACKGROUND OF THE INVENTION

The present invention relates generally to an aircraft fuel tank, designed primarily for military aircraft, to minimize the damage caused by projectiles from enemy gunfire.

Fuel tanks in military aircraft present one of the most vulnerable components that can cause the disabling and/or destruction of the aircraft. This condition is particularly prevelant in low-flying operations where the aircraft is subject to gunfire from enemy ground troops using either hand guns or fixed installation weapons. Typical examples of these projectiles are 14.5 mm A.P.I. (Armor Piercing Incendiary) and 23 mm H.E.I. (High Explosive Incendiary). In-flight fires are by far the most frequently reported casualty (60–70%) of the combat losses on which reports are available. Aircraft fuel tanks hit by projectiles or shrapnel may be subjected to one or more of several casualties such as loss of fuel, fire, or explosion outside the punctured fuel tank in the surrounding structural cavity, and rupture of aircraft structure and fuel tank due to the transmission of the bullet kinetic energy in the form of hydrodynamic ram pressure which creates destructive shock waves. These casualties are particularly severe when a fuel tank wall is adjacent the engine inlet (normally where such fuel tank wall forms a common wall with the engine inlet wall). The hydrodynamic ram pressure can cause a rupture of the engine inlet duct dumping large quantities of fuel directly into the engine resulting in a flame-out, fire, or in the worst case, an explosion.

The phenomenon of hydrodynamic ram effects in liquids is well known and much has been developed to lessen the destructive effects of this phenomenon, especially in military combat aircraft fuel tanks. The standard self sealing tank will usually seal punctures caused by small caliber ammunition. However, the hydrodynamic ram effect created by these small caliber projectiles is minimal. Punctures caused by large caliber projectiles, such as 23 mm HEI, are not effectively sealed by state of the art fuel tanks. This factor, in conjunction with the significant hydrodynamic ram effect caused by the large caliber projectiles results in one or more of the aforementioned casualties.

Various attempts have been made to resolve the above problems by attenuating the hydrodynamic ram effect. However, none has shown success of consequence. One such design is to cover the tank exit wall with a rigidized crushable foam. Another technique is the use of various honeycomb sandwich constructions such as aluminum covered with either graphite epoxy or Kevlar.

Another such attempt is to place armor plate such as titanium on the exit wall of the fuel tank. However, this technique is both expensive and heavy and reflects the shock wave back to the entry wall which suffers extensive damage.

SUMMARY OF THE INVENTION

It is, therefore, an object of this invention to improve the design of aircraft fuel tanks to reduce their vulnerability to potential damage.

It is another object of the present invention to provide an aircraft fuel tank that will minimize the hydrodynamic pressure wave energy resulting from a large caliber projectile penetrating the fuel tank.

It is another object of this invention to provide an aircraft fuel tank having a wall adjacent an engine inlet duct and with a frangible liner that will minimize the hydrodynamic pressure wave energy resulting from large caliber projectiles penetrating the fuel tanks.

It is still another object of this invention to provide an aircraft fuel tank that will minimize fuel loss and fires resulting from a large caliber projectile penetrating the fuel tank.

An aircraft fuel tank is provided which comprises a segmented container having a linear and a securing means. The securing means fastens the liner to an internal wall of the container. The securing means also spaces the internal wall from the securing means. The linear divides the container into two segments, an auxiliary tank between the internal wall and liner, and a main tank on the other side of the liner. The liner is constructed of a shock attenuating frangible membrane. Impact damage by a projectile piercing the fuel tank is minimized by the liner deflecting (and normally also rupturing) and thereby attenuating hydrodynamic ram pulse energy created by shock waves produced by the projectile. In the preferred embodiment, the auxiliary tank would be adjacent to an engine inlet duct of the aircraft.

Other objects and advantages of the invention will become apparent upon reading the following detailed description and upon reference to the drawings.

While the invention will be described in connection with the preferred embodiments, it will be understood that it is not intended to limit the invention to those embodiments. On the contrary, it is intended to cover all alternatives, modifications, and equivalents that may be included within the spirit and scope of the invention as described by the appended claims.

DETAILED DESCRIPTION OF THE INVENTION

Figure 1:
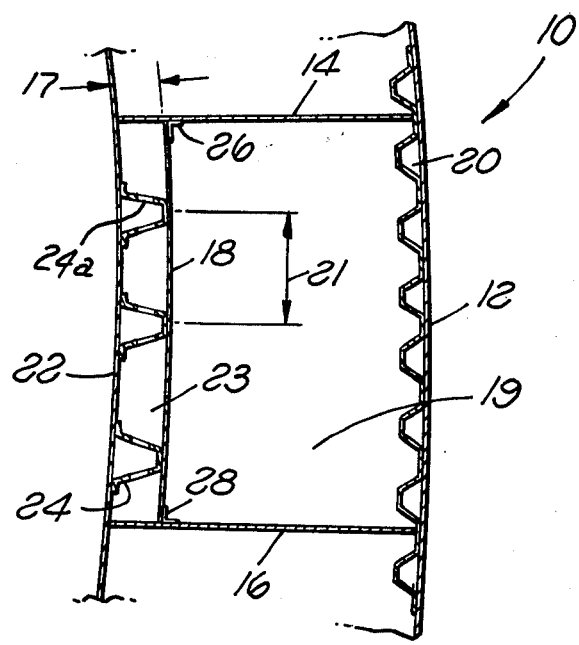
FIG. 1 is a fragmentary cross-sectional upper plan view of one side of a fuselage saddle tank according to the present invention.

Referring to FIG. 1, there is shown according to the present invention, a top sectional view of an aircraft fuselage fuel tank generally indicated at 10. Fuselage fuel tank 10 has side walls comprised of the outside fuselage skin 12, bulkheads 14 and 16 and engine inlet duct wall 22. Fuselage skin 12 has attached stiffeners 20 secured thereto. A liner 18 in the form of a sheet is positioned inside tank 10 to divide tank 10 into two cavities or segments. In this manner a main tank 19 and auxiliary tank 23 are defined. Engine inlet duct wall 22 is separated from liner 18 with a spacing 17 of at least 4 inches by supporting members 24. Liner 18 is preferably positioned parallel to wall 22. The spacing 17 defines the width of auxiliary tank 23. If the space is less than 4 inches, it has been found that a ruptured liner would damage and sometimes penetrate the duct wall.

Supporting members 24, which are preferably hat sections, are secured to both the engine inlet duct wall 22 and the liner 18. The height of members 24 substantially corresponds to spacing 17 such that members 24, in addition to fastening liner 18 to wall 22, separate or space the liner 18 from wall 22. The hat sections 24 have openings or apertures 24a in the sides thereof to allow the fuel in auxiliary tank 23 to have free fluid flow or communication in tank 23 and to fully drain therefrom. The edges of liner 18 are also secured to bulkheads 14 and 16 by fasteners 26 and 28 respectively.

Another embodiment (not shown) would be represented by the engine inlet duct passing through the root of a wing. In this embodiment, the front and rear spar webs of the wing would correspond to bulkheads 14 and 16 and the fuselage skin 12 would represent the opposite wall of an integral wing fuel tank.

Another embodiment (not shown) would be represented by an integral wing tank isolated from the engine inlet duct. In this embodiment, bulkheads 14 and 16 would be represented by the front and rear spar webs respectively of the wing while fuselage skin 12 and duct wall 22 would represent the opposite ends of the integral wing fuel tank. In this embodiment, a plurality of auxiliary tanks could be formed, one attached to each tank wall (including the top and bottom if the tank is rectangular in shape). In this manner, the auxiliary tanks would provide hydrodynamic pressure protection against a projectile entering this fuel tank from any direction.

The liner 18 can be made from a number of materials, such as aluminum sheet 2024-T3 and 7075-T73. Other materials which can be used are composites such as graphite epoxy sheet and Kevlar sheet. Still other appropriate liners could be made from aluminum honeycomb with face sheets of composite or Kevlar. However, it is required that the liner material be both ductile and frangible in order to provide an energy absorbing capability by distorting and rupturing.

While the above materials are successful to some degree, the preferred embodiment material is 7075-T73. Other important factors in the present invention are the liner material thickness which can vary from about 0.03 to 0.25 inches and the lateral spacing 21 between members 24 which can vary from about 4 to 16 inches. It was found that the preferred embodiment would be a liner material thickness of about 0.04 inches and a support spacing of about 11 inches.

From tests and evaluation thereof, it was found that in order to provide effectiveness of attenuation of hydrodynamic pressure shock waves resulting from 23 mm caliber H.E.I. (High Explosive Incendiary) projectiles, a 7075-T73 liner of less than 0.03 inch should not be used as it would allow extensive damage to an engine inlet duct 27 (due to insufficient absorption of the ram pressure wave). It was also determined that a liner thickness greater than 0.25 inches will not distort the liner 18 sufficiently. This might result in pushing the supports 24 into the duct wall 22 causing extensive damage.

While support member 24 is shown as a hat section and is the preferred embodiment, other support members such as an I-beam member or a one-half I-beam member can be used. The support spacing 21 depends on the liner material type and thickness, i.e. optimum hydrodynamic ram attenuation is a function of these three factors which should be considered in conjunction with one another. However, a spacing less than 4 inches was found to force the support members into the duct wall 22 causing damage while a spacing greater than 16 inches did not provide sufficient support and allowed the liner to rupture prematurely without providing sufficient protection.

It has also been found that another factor to consider is fuel tank depth. A minimum of about 8 inches is required to utilize a hydrodynamic pressure wave absorbing system according to the present invention. The pressure waves in a tank with less than 8 inches depth become too distorted and present a threat to the tank side walls as well as the exit wall. Further, anything less than 8 inches depth will not make it practical to subdivide the tank.

Figure 2:
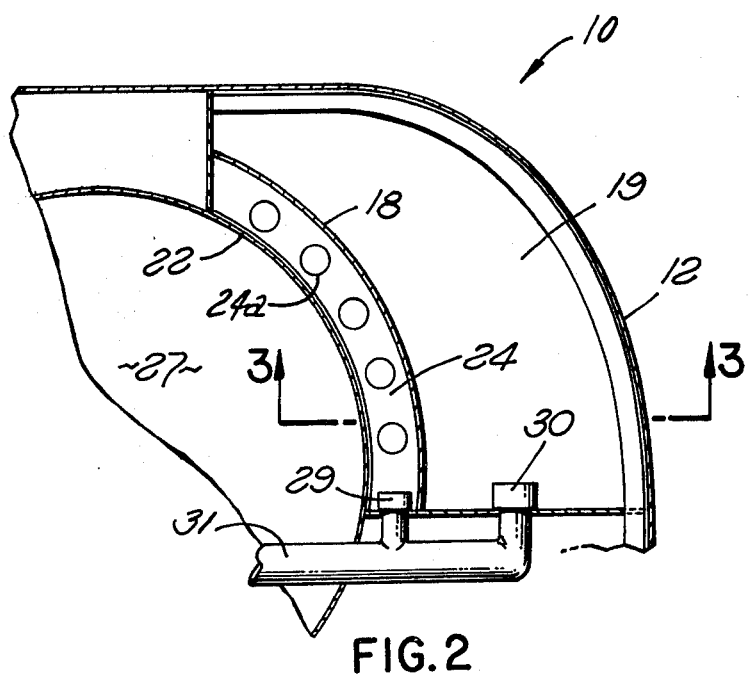
FIG. 2 is a cross-sectional elevational view of the fuselage saddle tank of FIG. 1.

FIG. 2 illustrates an end view of a cross section of one-half of the fuselage saddle tank 10 (looking into the duct 27) where the internal wall 22 of tank 10 is positioned adjacent to the engine inlet duct 27. In this regard, wall 22 forms a common wall with the engine inlet duct wall.

FIG. 2 also portrays a fuel management means including a fuel manifold 31 and fuel pumps 29 and 30. This means allows for the fuel to be used from the auxiliary tank 23 first (before main tank 19) prior to entering the combat zone where the threat is the highest. This is accomplished by actuating pump 29 and withdrawing the fuel from tank 23 prior to activating pump 30. The actuation system (not shown) for the pumps 29 and 30 may be any state of the art type system. For example, if the pumps 29 and 30 are electrically powered, then they can be simply connected to a source of power through a switch operable by the pilot of the aircraft. In order for the invention to be effective, the auxililary tank 23 must be substantially empty, otherwise the pressure shock waves would be transmitted directly to the duct wall 22 through continuous fluid flow causing extensive damage.

Figure 3:
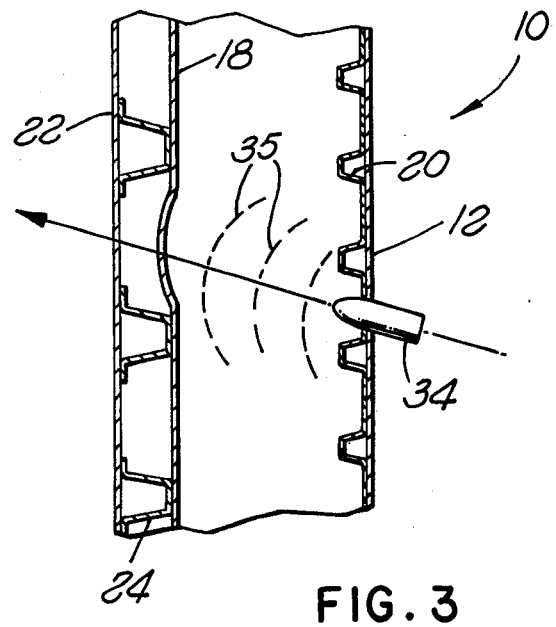
FIG. 3 is a fragmentary cross-sectional view of the tank of FIG. 2 taken in the direction of arrows 3—3 showing the shock wave formation and projectile penetration.

Referring to FIG. 3, an example is presented of how the pressure waves 35 are formed by projectile 34, and transmitted and absorbed by the liner 18. Liner 18, which must be sufficiently ductile, is shown absorbing the shock wave by distorting and stretching (it may also rupture) to absorb the kinetic energy of the shock waves 35.

Figure 4:
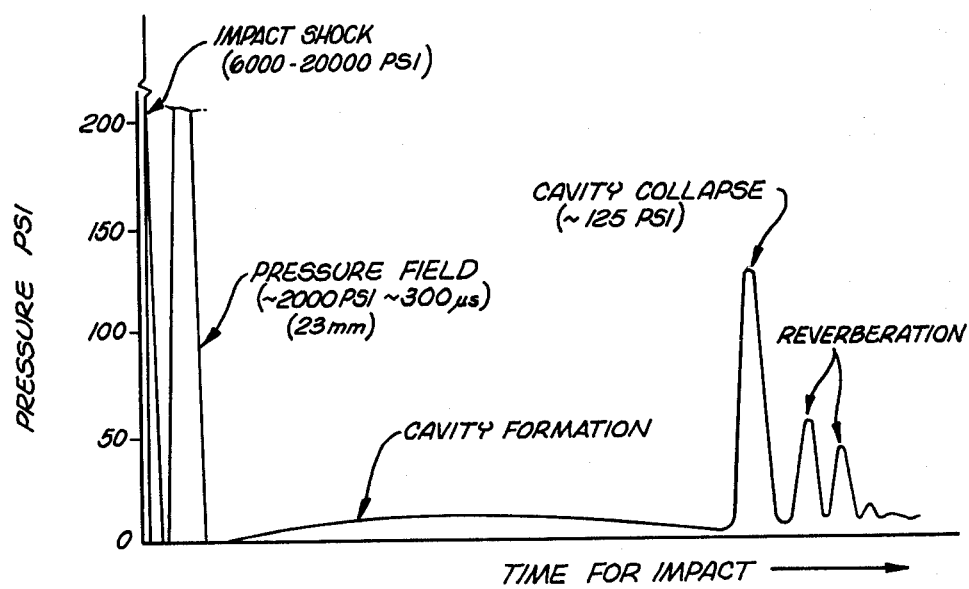
FIG. 4 is a typical graph displaying a time history of the hydrodynamic phenomenon and the resulting pressure waves.

The hydrodynamic phenomonen as it occurs in a fuel tank is graphically presented in FIG. 4. As the projectile nose engages the liquid fuel, it displaces the fluid by compression. The localized high pressure causes an impact shock wave to move radially outward from the impact point and the impulse, which is the pressure times the duration of the pulse, is small. As can be seen in FIG. 4, the initial shock wave pressure decays rapidly with time and the impulse is too weak to cause any damage when it reaches the exit wall of the tank.

The second phase is defined as the pressure field phase and is generated by the movement of the projectile through the fluid. This pressure wave is due to the drag of the projectile through the fluid and travels at sonic velocity of the fluid which is faster than the speed of the projectile. The pressure wave travels ahead of the projectile and creates a strong impulse against the exit wall. It is this pressure wave that causes the most hydrodynamic ram damage. The present invention is designed to minimize the hydrodynamic ram damage from this pressure wave.

A third but a less important phase is the cavity formation behind the projectile and the cavity collapse. This was found to cause minimal damage to the structure from hydrodynamic ram.

Thus, it is apparent that there has been provided, in accordance with the present invention, a hydrodynamic ram attenuating fuel tank that fully satisfies the objectives, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations that fall within the spirit and scope of the appended claims.

What is claimed is:

1. In an aircraft having an engine inlet duct, a fuel tank subject to penetration by a projectile comprising:
    a casing defining a hollow fuel storage compartment, said casing being comprised of a plurality of walls connected together to form said casing, one of said walls being a common wall of said inlet duct by also forming a portion of a wall of said inlet duct;
    a liner in the form of a sheet positioned within said casing to partition said storage compartment into two cells, said liner forming only one side of each of said two cells, one cell being a main tank and the other cell being an auxiliary tank, said liner being constructed of a shock attenuating frangible membrane;
    securing means fastening said liner to said common wall, said liner being spaced from said common wall by said securing means, said liner in combination with said securing means having preselected strength characteristics relative to said common wall such that said liner will deflect and rupture under hydrodynamic ram pulse energy sufficient to puncture said common wall created by shock waves resulting from the projectile penetrating within said fuel tank with hydrodynamic ram pulse energy attenuation by said deflection and rupture of said liner being substantially maximized, whereby impact damage to said common wall from said shock waves is reduced.

2. A fuel tank as described in claim 1 wherein said liner is positioned parallel to said common wall.

3. A fuel tank as described in claim 2 also including fuel management means connected to said fuel tank for withdrawing fuel from said fuel tank, said fuel management means withdrawing substantially all the fuel from said auxiliary tank before withdrawing fuel from said main tank.

4. A fuel tank as described in claim 3 wherein said liner has a thickness in the range of from about 0.03 inches to 0.25 inches.

5. A fuel tank as described in claim 4 wherein said securing means comprises a plurality of fastening members, said members being connected to said common wall and said liner.

6. A fuel tank as described in claim 5 wherein said fastening members have a lateral spacing between each other in the range of about 4 to 16 inches.

7. A fuel tank as described in claim 6 wherein said liner is of a composite material.

8. A fuel tank as described in claim 6 wherein said liner is of a metal material.

9. A fuel tank as described in claim 6 wherein the minimum spacing of said liner from said common wall is 4 inches.

10. A fuel tank as described in claim 9 wherein said securing means allows fuel communication within said auxiliary tank.

11. A fuel tank as described in claim 10 wherein said fuel tank has a depth of at least 8 inches.

* * * * *